May 10, 1955     W. W. CUSHMAN ET AL     2,708,023
BEARINGLESS ROLLER CONVEYOR
Filed March 3, 1954
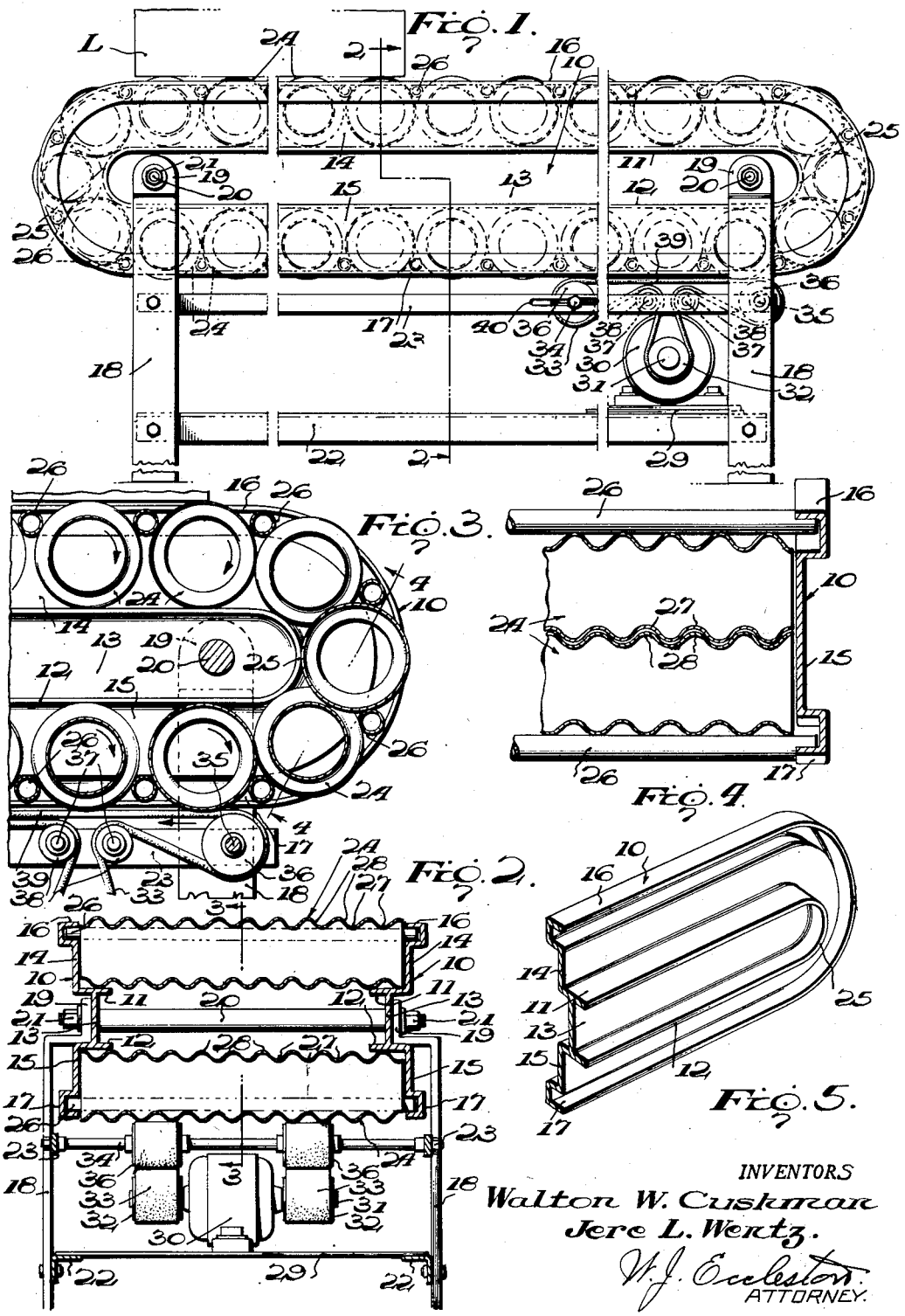
INVENTORS
Walton W. Cushman
Jere L. Wertz.
W. J. Eccleston
ATTORNEY.

United States Patent Office 2,708,023
Patented May 10, 1955

2,708,023

BEARINGLESS ROLLER CONVEYOR

Walton W. Cushman, Webb City, Mo., and Jere L. Wentz, Passaic, N. J., assignors to the United States of America as represented by the Secretary of the Army Application March 3, 1954, Serial No. 413,972

6 Claims. (Cl. 198—183)

Our invention relates to roller conveyors.

A primary object of the invention is to provide a powered roller conveyor, wherein a plurality of separate unconnected working and idler rollers travel continuously about an endless track, without the necessity of ball bearings or like frictionless bearings for the ends of the individual rollers.

Another object is to provide a roller conveyor embodying a plurality of relatively large fluted or corrugated working rollers and a corresponding number of relatively small idler rollers arranged between the working rollers and suppoting the weights of the working rollers at the lower sides or runs of the conveyor, the corrugated working rollers intermeshing or overlapping as they travel about the curved ends of the conveyor tracks, in order to maintain the idler rollers in proper supporting relationship therewith.

A further object is to provide a powered roller conveyor of the above character, which may be constructed in substantially any desired length, and which is simplified, compact, sturdy and relatively inexpensive to build.

Other objects and advantages of the invention will be apparent during the course of the following description.

In the accompanying drawings, forming a part of this application, and in which like numerals are employed to designate like parts throughout the same, Figure 1 is a side elevation of a roller conveyor embodying our invention, parts broken away, Figure 2 is a transverse section taken on line 2—2 of Figure 1, Figure 3 is an enlarged fragmentary longitudinal vertical section taken on line 3—3 of Figure 2, Figure 4 is a fragmentary diagonal section taken on line 4—4 of Figure 3, and Figure 5 is an enlarged fragmentary perspective view partly in section of a track section of our roller conveyor.

In the drawings, where for the purpose of illustration is shown a preferred embodiment of our invention, the numeral 10 designates generally companion or identical endless tracks or frame sides for the conveyor. The tracks 10 comprise vertically spaced upper and lower horizontal longitudinal flanges 11 and 12, connected by continuous vertical webs 13, rigidly secured thereto and preferably formed integral therewith. Vertical side walls 14 and 15 extend above and below the horizontal flanges 11 and 12 and are integrally secured thereto adjacent to the outer sides of the flanges 11 and 12, Figure 2. Parallel horizontal longitudinal track extensions 16 and 17, substantially C-shaped in cross section are integrally secured to the upper and lower edges of the side walls 14 and 15 respectively. The tracks 10 are straight and may be made in any desired length, such as 10 ft., and we contemplate forming the tracks 10 as extrusions from aluminum, magnesium, or the like.

The tracks 10 are circularly curved at their opposite ends, as shown in the drawings, and the curved ends of the tracks may be turned in a lathe or the like to form circular bodies, and then cut in half diametrically to provide the semi-circular end sections for the tracks 10. The semi-circular end sections of the tracks 10 are of the identical shape in cross section as that shown for the tracks 10 in Figure 2, except that the flanges 11 and 12, side walls 14 and 15 and track extensions 16 and 17 are all circularly curved longitudinally and are concentrically arranged, as shown in Figures 1 and 3 of the drawings. The semi-circular track ends may be permanently rigidly secured to the straight track sections by welding or the like, and the resultant construction provides the endless horizontally elongated frame sides or tracks 10 illustrated in Figure 1.

Vertical legs 18 are provided to support the tracks 10 at the desired elevation, and these legs may be of any desired length. The legs 18 are provided at their upper ends with inwardly directed L-shaped extensions 19, engaging between the horizontal flanges 11 and 12, adjacent to the outer sides of the walls 13. The extensions 19 of the legs are rigidly connected with the track walls 13 by horizontal transverse through bolts 20 or the like, provided at their ends with nuts 21. The legs 18 are secured to the tracks 10 near their opposite ends, as shown.

The legs 18 at each side of the conveyor are rigidly connected by horizontal longitudinal angle bars 22, rigidly secured thereto. An additional pair of horizontal longitudinal bars 23 are rigidly secured to the legs 18 a substantial distance above the angle bars 22, and near and below the lower sides of the tracks 10.

A plurality of closely spaced transverse horizontal tubular working rollers 24 are provided, and the lengths of the rollers 24 are such that they extend for substantially the entire distance between the vertical flanges 14 and 15 in assembly, and have their opposite ends arranged close to these flanges, although spaced slightly therefrom, Figure 2. The rollers 24 at the upper side of the conveyor roll upon and are supported by the horizontal flanges 11, and the rollers 24 at the lower side of the conveyor are adapted to roll along the horizontal flanges 12, and are supported by idler rollers, to be described. At the ends of the conveyor, the rollers 24 roll upon the circularly curved flange portions 25 connecting the horizontal flanges 11 and 12, as shown in Figures 1 and 3. The vertical flanges or walls 14 and 15 restrain the rollers 24 from endwise movement as they travel about the endless tracks 10.

Tubular cylindrical idler rollers 26 of substantially reduced diameter and somewhat longer than the rollers 24 have their end portions received by the C-shaped track extensions 16 and 17 and supported thereby, along the top, bottom and ends of the conveyor tracks. The idler rollers 26 are disposed between the working rollers 24, and frictionally contact the same at all points about the conveyor tracks 10. Along the top sides of the conveyor tracks, the idler rollers 26 are disposed near and slightly below the tops of the rollers 24, and the tops of the rollers 24 project slightly above the tops of the track extensions 16. The idler rollers 26 are restrained from appreciable endwise movement by the C-shaped track extensions 16 and 17, as shown. Along the bottom sides of the tracks 10, the idler rollers 26 are likewise arranged between the working rollers 24, but near and slightly above the bottoms of the working rollers. The bottoms of the working rollers 24 along the lower side of the conveyor project slightly below the bottoms of the track extensions 17. The working rollers 24 along the bottom sides of the tracks 10 are bodily supported by the ilder rollers 26, as they travel horizontally between the circularly curved ends of the tracks 10. The idler rollers 26 at the ends of the conveyor also partially support the end working rollers 24, and restrain them from movement away from the circularly curved track flanges 25.

As shown in the drawings, the working rollers 24 are corrugated or fluted throughout their lengths to provide uniformly spaced annular grooves 27 and ridges or corrugations 28. During the travel of the working rollers 24 along the horizontal portions of the tracks 10, their peripheries are spaced apart slightly, as shown in Figure 3 and the cylinder idler rollers 26 engage and roll against the peripheries of the annular corrugations 28. As the working rollers 24 pass around the circularly curved ends of the conveyor tracks 10, their spaced relationship diminishes, and interfitting or intermeshing of the annular corrugations and grooves 28 and 27 takes place, as indicated in Figures 3 and 4. This prevents interference and binding of the working rollers 24, and allows the idler rollers 26 to maintain the proper restraining relationship with the rollers 24. The idler rollers 26 at the curved ends of the conveyor continue to engage and roll over the peripheries of the corrugated working rollers 24.

The working rollers 24 and idler rollers 26 rotate in opposite directions during their passage about the endless tracks 10.

A horizontal support plate 29 is rigidly secured to the tops of the angle bars 22 near one of the conveyor, and extends transversely between the adjacent pair of legs 18, as shown in Figure 2. An electric motor 30 is rigidly mounted upon the support plate 29 at the transverse center of the conveyor and has a horizontal transverse armature shaft 31 extending beyond opposite sides of the same. Pulleys 32 are secured to the opposite ends of the armature shaft 31 for rotation therewith, and wide flat belts 33 are trained about the pulleys 32 to be driven thereby, as shown.

Transverse horizontal shafts 34 and 35 have their ends rigidly secured to the horizontal longitudinal bars 23, and are arranged at the same elevation and spaced equidistantly from the opposite sides of the motor 30, Figure 1. Pulleys 36 are journaled upon the shafts 34 and 35 for rotation, and arranged in alignment with the armature shaft pulleys 32, as shown in Figure 2. Additional horizontal transverse shafts 37 having pulleys 38 journaled thereon extend between the horizontal longitudinal bars 23 and are rigidly secured thereto. The pulleys 38 are likewise in the same vertical planes and in alignment with the pulleys 32 and 36, as shown. The belts 33 are trained about the pulleys 36 and 38 in the manner shown in the drawings, and a horizontal run 39 of the belt is disposed in frictional contact with the bottoms of a plurality of the working rollers 24, adjacent one end of the conveyor, Figure 1. The horizontal longitudinal bars 23 are preferably slotted at 40 for receiving the transverse shaft 34, and this arrangement permits adjusting the shaft 34 longitudinally of the bars 23 to tighten or loosen the belts 33. As shown in Figure 2, the belts 33 are wide enough to engage adjacent pairs of the annular corrugations 28.

In operation, the motor 30 drives the belts 33 in the direction of the arrow in Figure 3, or in the opposite direction if preferred. With the belts moving in the direction of the arrow in Figure 3, the tension of the belt forces the tops of the working rollers 24 adjacent to it against the lower side of the horizontal flange 12, and the rollers 24 will roll along the flange 12 in the direction indicated by the arrows. The idler rollers 26 are not engaged directly by the belts 33, but do constantly frictionally engage the working rollers 24, and are driven or rotated in opposite directions to the working rollers, as they roll along the lower track extension 17. Except for the working rollers 24 which engage the upper runs 39 of the belts, all of the rollers 24 at the bottom of the conveyor are supported by the idler rollers 26, as previously stated, and all of the working rollers roll along the lower sides of the horizontal flanges 12 and turn in the direction of the arrows in Figure 3. Along the upper side of the conveyor, the working rollers 24 are supported by and roll along the horizontal flanges 11 in the direction of the arrows, and the idler rollers 26 turn in the opposite direction.

A load L such as a corrugated pasteboard carton or the like is placed upon the upper run of working rollers 24, and is propelled along the conveyor by the rotation of the rollers 24. It is to be noted that the load L will move longitudinally along the conveyor at twice the lineal speed of the rollers 24, due to their rolling engagement with the bottom of the carton or load and with the flanges 11.

It is to be understood that the form of our invention, herewith shown and described is to be taken as a preferred example of the same, and that various changes in the shape, size and arrangement of parts may be resorted to, without departing from the spirit of the invention or scope of the subjoined claims.

Having thus described our invention, we claim:

1. In a roller conveyor, a pair of spaced apart endless tracks having top and bottom sides and curved ends, endless track extensions secured to the top and bottom sides of said tracks and extending parallel therewith throughout the entire lengths of the tracks, a plurality of closely spaced relatively large corrugated working rollers engaging the endless tracks and adapted to roll along the top and bottom sides and ends of the tracks, a plurality of relatively small idler rollers engaging the track extensions and rolling along the same, the idler rollers being arranged between the working rollers and spaced inwardly of the outer sides of the working rollers, the idler rollers at the lower sides of the conveyor supporting the working rollers, and friction belt means engaging certain of the working rollers to rotate the same.

2. A roller conveyor comprising spaced elongated endless tracks having top and bottom sides and curved ends, side walls secured to the top and bottom sides and ends of said tracks, track extensions carried by said side walls adjacent to their outer edges and spaced laterally outwardly of the top and bottom sides of said tracks, relatively large working rollers engaging the top and bottom sides and curved ends of the tracks and adapted to roll therealong, relatively small idler rollers arranged between the working rollers and frictionally contacting their peripheries and having their ends projecting beyond the ends of the working rollers and engaging the track extensions to roll therealong, the side walls of said tracks being arranged adjacent to the ends of the working rollers to restrain them from endwise movement, the idler rollers along the bottom of the conveyor supporting the weights of the working rollers, the working rollers along the top of the conveyor being supported by the upper sides of the tracks, and friction means engaging certain of the working rollers to drive the same.

3. The construction set forth by claim 2 wherein the working rollers have annular corrugations adapted to interfit as the working rollers pass about the curved ends of the tracks.

4. A roller conveyor comprising a pair of endless tracks having upper and lower track flanges and side walls secured to the track flanges, substantially C-shaped track extensions secured to the side walls of the tracks above and below said track flanges, a plurality of relatively large corrugated working rollers engaging said track flanges to roll along the same and having their ends arranged in opposition to said side walls of the tracks to prevent appreciable endwise movement of the working rollers, relatively small idler rollers longer than the working rollers and arranged therebetween and having their ends received by the C-shaped track extensions and rolling therealong, the idler rollers frictionally engaging the peripheries of the working rollers and bodily supporting the working rollers along the lower side of the conveyor, and friction belt means engaging the peripheries of certain of the working rollers to rotate the same.

5. A roller conveyor comprising a pair of spaced horizontally elongated endless tracks having upper and lower horizontal track flanges and circularly curved ends connecting the track flanges, vertical side wall extensions secured to said track flanges adjacent their outer edges and projecting above and below the upper and lower track flanges respectively and radially outwardly of said circularly curved ends, substantially C-shaped track extensions carried by said side wall extensions and extending continuously about the marginal edges of the same and opening inwardly, the track extensions projecting laterally outwardly of the side wall extensions and track flanges, means connected with the tracks for supporting them at the desired elevation, a plurality of corrugated working rollers rollingly engaging the upper and lower track flanges and circularly curved ends and having ends positioned between said side wall extensions and arranged close to the side wall extensions and held thereby against appreciable endwise movement, a plurality of cylindrical idler rollers longer than the working rollers arranged between the working rollers and frictionally contacting their peripheries and having their end portions received by the inwardly opening track extensions and supported thereby for rolling movement along the track extensions, the outer sides of the corrugated working rollers projecting outwardly of said idler rollers and outwardly of the track extensions, and driving means including an endless flexible element engaging the outer sides of certain of said corrugated working rollers to rotate the same, and causing all of the working and idler rollers to travel about said endless tracks.

6. In a roller conveyor device, a pair of elongated endless tracks having curved ends, endless track extensions carried by said tracks, a plurality of corrugated working rollers engaging the endless tracks and adapted to travel about the same, a plurality of relatively small idler rollers arranged between the working rollers and frictionally contacting the same and engaging the endless track extensions and adapted to travel about the same, the corrugations of the working rollers interfitting as the working rollers move about the curved ends of the tracks and thereby permitting the working rollers to change their relatively spaced relationship without binding, and means connected with certain of the working rollers to drive the same about the endless tracks.

References Cited in the file of this patent

UNITED STATES PATENTS 2,679,953     Field _____ June 11, 1954

FOREIGN PATENTS 249,798     Germany _____ July 30, 1912